United States Patent [19]  [11] 4,130,319
Gapper  [45] Dec. 19, 1978

[54] MINING MACHINES
[75] Inventor: Terence J. Gapper, Duffield, England
[73] Assignee: Coal Industry (Patents) Limited, London, England
[21] Appl. No.: 663,785
[22] Filed: Mar. 4, 1976
[30] Foreign Application Priority Data
Mar. 25, 1975 [GB] United Kingdom ............... 12386/75
[51] Int. Cl.² ............................................. E21C 35/08
[52] U.S. Cl. ..................................... 299/1; 33/141 E; 33/142; 33/144; 104/279
[58] Field of Search ............... 299/1, 43, 3; 173/21, 11; 33/141 E, 142, 144; 104/279

[56] References Cited
U.S. PATENT DOCUMENTS

| 2,025,569 | 12/1935 | Carter | 33/144 |
| 2,853,957 | 9/1958 | Dean et al. | 104/279 |
| 3,664,117 | 9/1971 | Beckman | 33/144 |
| 3,688,410 | 9/1972 | Zeidler | 33/142 |
| 3,700,164 | 10/1972 | Slagle | 33/141 E |
| 3,866,539 | 2/1975 | Gasse | 104/279 |
| 3,980,338 | 9/1976 | Weber | 299/1 |

FOREIGN PATENT DOCUMENTS

| 1226971 | 10/1966 | Fed. Rep. of Germany | 299/1 |
| 1266259 | 4/1968 | Fed. Rep. of Germany | 299/1 |
| 1266766 | 4/1968 | Fed. Rep. of Germany | 299/1 |

Primary Examiner—Ernest R. Purser
Assistant Examiner—William F. Pate, III
Attorney, Agent, or Firm—James C. Wray

[57] ABSTRACT

A longwall mining machine is provided with a roller resiliently urged into engagement with a track extending along the longwall face. Sensor means are provided to sense rotation of the roller and derive a signal indicative of the machine's position along the longwall face.

12 Claims, 5 Drawing Figures

FIG.1

MINING MACHINES

The present invention relates to mining machines which in use traverse to and fro along tracks extending along working faces.

In particular, although not exclusively, the present invention relates to such a mining machine which has a cutter and which is provided with sensing means for sensing the cutting horizon of the cutter within a mineral seam. In order to steer the machine along a desired path it is necessary to determine the current position of the machine along the working face.

An object of the present invention is to provide an improved mining machine having equipment for sensing the position of the machine along the working face.

According to the invention, a mining machine which in use traverses to and fro along a track comprises a body adapted to be hauled to and fro, a number of shoes supporting the body and movable along the track, and equipment for sensing the position of the machine along the track, the equipment comprising a roller drivably engageable with the track and means for sensing the number of rotations of the roller and for deriving a signal indicative of the number of rotations.

Preferably, the means senses the direction of rotation of the roller.

Conveniently, the means comprises at least two angularly spaced sensor devices arranged to sense rotation of a disc fixedly mounted with respect to the roller.

Preferably, the disc has a number of indicator means arranged to pass in sequence adjacent to the sensor devices which may be, for example, optical or magnetic devices.

By way of example only, one embodiment of the present invention will be described with reference to the accompanying drawings in which.

Figure 1:
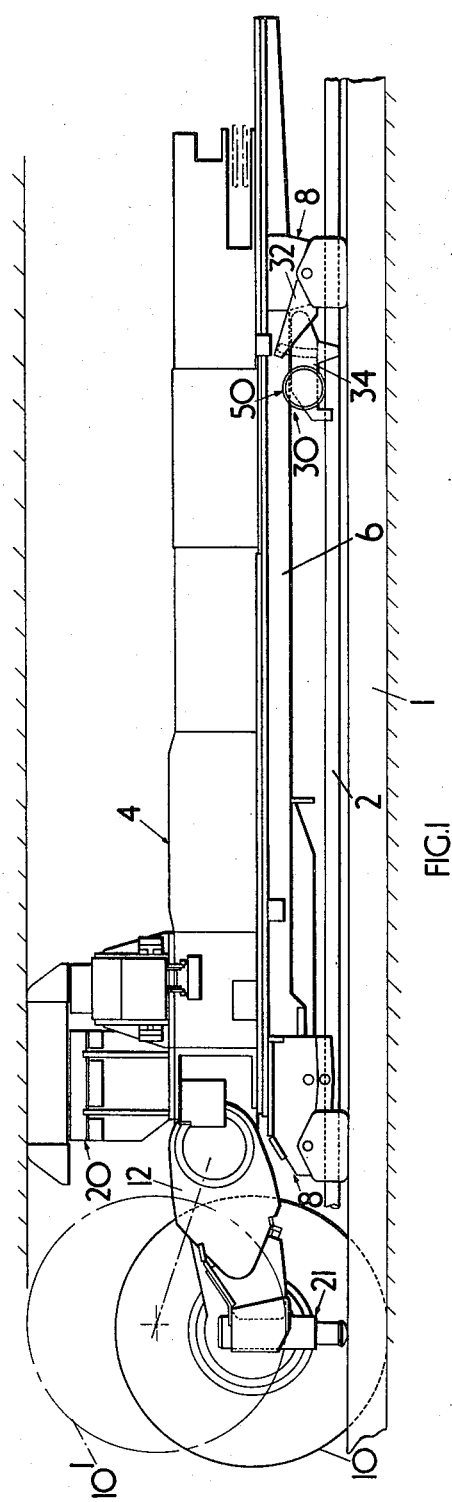
FIG. 1 is a side view of a mining machine in an operational position and constructed in accordance with the present invention.

Referring to FIG. 1 of the drawings, a coal mining machine is shown in an operable position traversing to and fro along a track including an armoured face conveyor 1 and a tubular guide rail 2.

The machine has a body 4 made up of a number of drive and control sections and carried on an underframe 6 having four shoes 8 (only two of which can be seen) located adjacent to the corners of the underframe. The two shoes which are shown are arranged to move along the rail 2.

A rotary cutter drum 10 is mounted on the free end of the arm 12 pivotally supported on the body 4, pivotal movement of the arm being controlled by a hydraulic jack not shown. Gearing within the body 4 and arm 12 drivably connects the rotary cutter drum with a drive motor within the body so that as the machine hauls itself along a stationary haulage chain or rack (not shown) extending along the working face the cutter drum wins mineral from the face. One strip of mineral is won from the working face for every two traverses of the machine along the face, the two traverses being associated with the cutter drum in the raised and lowered positions $10^1$ and 10 respectively.

The machine also is provided with means 20 for sensing the cutting horizon of the cutter drum within the seam and means 21 for sensing the height of the cutter drum above the mine floor. The means 20 and 21 derive signals indicative of their associated parameters which are fed to the machine steering control mechanism within the body of the machine.

In order to steer the machine along its desired path within the seam it is necessary to know the current position of the machine along the working face. This is achieved by providing equipment 30 attached to one of the underframe shoes 8.

Figure 2:
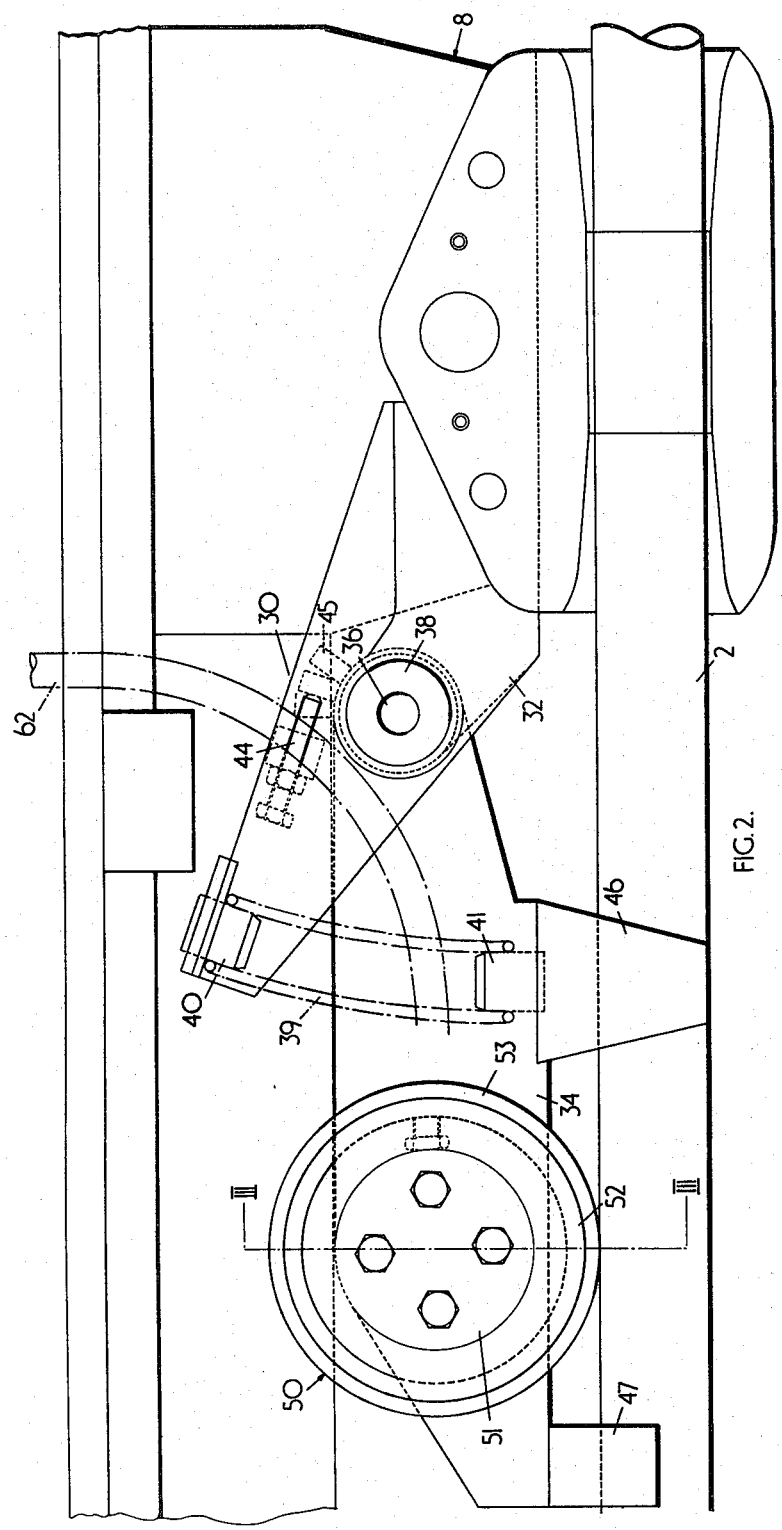
FIG. 2 is a side view of a detail of FIG. 1 shown on an enlarged scale.
Figure 3:
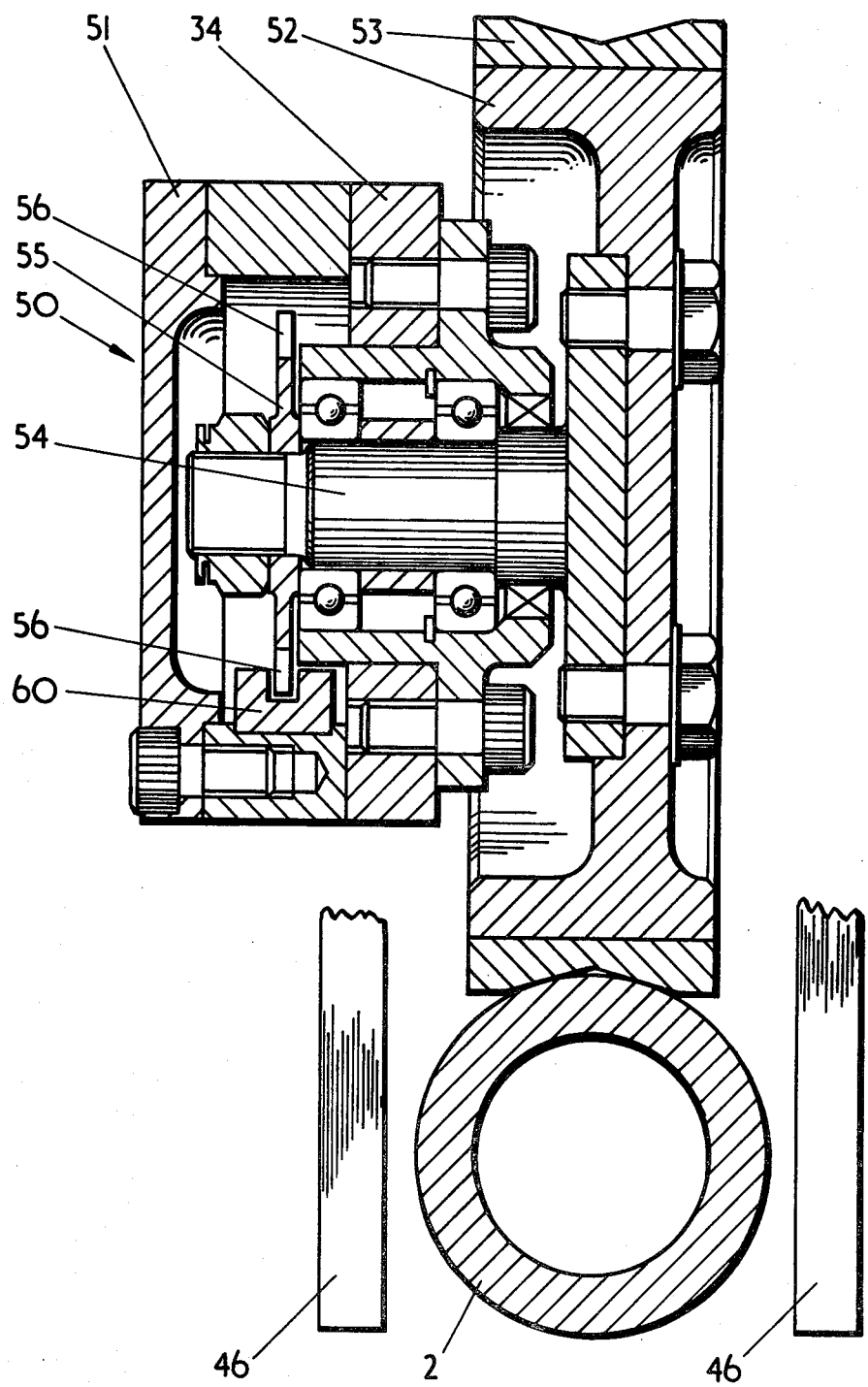
FIG. 3 is a section along line III—III of FIG. 2.

The equipment comprises an arm 32 (see FIGS. 1 to 5) constituted by two parallel plates welded to the shoe 8, a link 34 pivotally mounted on the arm 32 by a pivot pin 36 engaged within a bush 38 of the link which is urged downwards as seen in FIGS. 1, 2 and 3 of the drawings by a spring 39 engaging two spigots 40, 41 on the arm and link, respectively. Downward movement of the link (as seen in FIGS. 1, 2 and 3) is limited by an adjustable stop including a screw arrangement 44 on the arm and an abutment 45 on the link. In FIG. 2 the abutment is indicated in two alternative operational positions associated with the ends of pivotal movement of the link.

The spigot 41 is carried on one of two wiper members 46, 47 secured to the link and arranged to wipe the tubular rail 2 as the machine traverses to and fro along the track.

Figure 5:
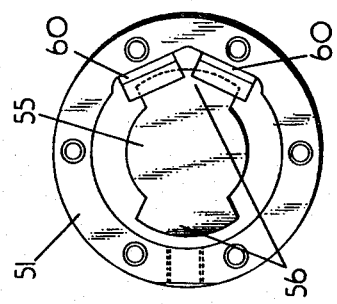
FIG. 5 is an incomplete side view of a detail of FIG. 2.
Figure 4:
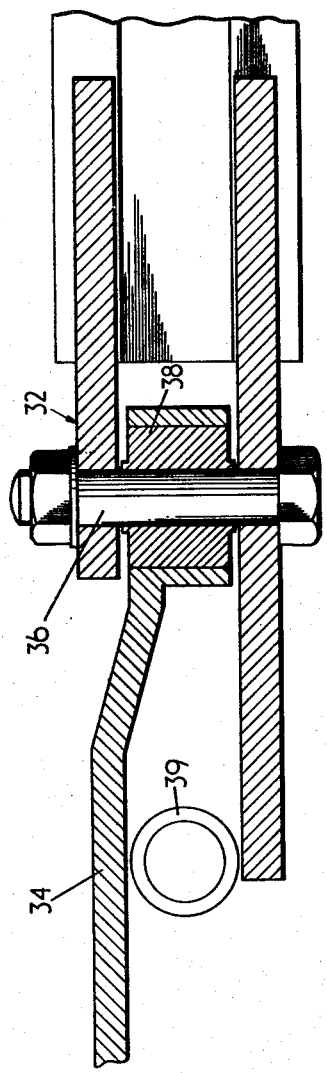
FIG. 4 is an incomplete plan of a portion of FIG. 2.

A roller mechanism 50 having a housing 51 mounted on the link 34, includes a roller 52 having a concaved rim 53 drivably engageable with the tubular rail 2 to rotate the roller to and fro as the machine traverses to or fro along the track and mounted on a shaft 54 drivably supporting a disc 55 having a number of indicator means, for example, two projections 56 (as seen in FIG. 5).

A magnetic sensor including a pair of angularly spaced devices 60 is fixedly mounted within the housing 51, each device having two limbs extending on opposite sides of the path of the projections 56 so as to sense rotation of the disc. Each time a projection passes between the limbs of one of the devices a signal is fed along a cable 62 to the machines' steering control means. Two devices 60 are provided in order that the control means can determine the direction of rotation of the disc and, thus the direction of traverse of the machine along the track.

In other embodiments of the invention the magnetic sensor is replaced by another form of sensor such as an optical sensor including for example at least one photoelectric cell.

It will be seen from the above description that the present invention provides a mining machine having relatively simple and compact equipment enabling the position of the machine along the track to be determined.

In modifications of the invention the disc may have one or more than two projections.

I claim:

1. A mining machine which in use traverses to and fro along a track comprising a body adapted to be hauled to and fro, a number of shoes supporting the body and movable along the track, and equipment mounted on one shoe for sensing the position of the machine along the track, the equipment comprising an arm connected to the one shoe, a pin connected to the arm remote from the shoe and transverse to the track, a link mounted for rotation on the pin, a roller on the link drivably engageable with the track and means for sensing the number of rotations of the roller and for deriving a signal indicative of the number of rotations.

2. A mining machine as claimed in claim 1, wherein the means senses the direction of rotation of the roller.

3. A mining machine as claimed in claim 2, wherein the means comprises at least two angularly spaced sensor devices, and a disc fixedly mounted with respect to the roller, the sensor devices sensing direction of rotation of the disc.

4. A mining machine as claimed in claim 3, wherein the disc has a number of indicator means arranged to pass in sequence adjacent to the sensor devices.

5. A mining machine as claimed in claim 4, wherein the roller is urged into contact with the track by resilient means.

6. A mining machine as claimed in claim 5, wherein the roller is carried on a pivotally mounted member.

7. A mining machine as claimed in claim 6, wherein the resilient means comprises spring means acting on the pivotally mounted member.

8. A mining machine as claimed in claim 1, comprising wiper means for wiping the track in front of the roller.

9. A mining machine as claimed in claim 7, comprising wiper means for wiping the track in front of the roller.

10. A mining machine as claimed in claim 1, wherein the roller is urged into contact with the track by resilient means.

11. A mining machine which in use traverses to and fro along a track comprising a body adapted to be hauled to and fro, a number of shoes supporting the body and movable along the track, and equipment mounted on one of the shoes for sensing the position of the machine along the track, the the equipment comprising an arm connected to one shoe, a pin connected to the arm remote from the shoe, the pin being oriented transverse to the track, a link connected to the pin for rotation thereon, and a roller drivably engageable with the track and means for sensing the number of rotations of the roller and for deriving a signal indicative of the number of rotations.

12. A mining machine as claimed in claim 11 further comprising wiper means mounted on the link on opposite sides of the roller.

* * * * *